United States Patent
Nakagawa et al.

(10) Patent No.: US 8,961,016 B2
(45) Date of Patent: Feb. 24, 2015

(54) LINEAR GUIDE APPARATUS

(75) Inventors: Takumi Nakagawa, Kanagawa (JP);
Jun Matsumoto, Kanagawa (JP);
Kazuhito Nishiyama, Kanagawa (JP);
Keisuke Tanaka, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/346,014

(22) PCT Filed: Aug. 22, 2012

(86) PCT No.: PCT/JP2012/005267
§ 371 (c)(1),
(2), (4) Date: Mar. 20, 2014

(87) PCT Pub. No.: WO2013/042312
PCT Pub. Date: Mar. 28, 2013

(65) Prior Publication Data
US 2014/0219587 A1    Aug. 7, 2014

(30) Foreign Application Priority Data

Sep. 21, 2011 (JP) .................................. 2011-206436
Aug. 22, 2012 (JP) .................................. 2012-183313

(51) Int. Cl.
*F16C 29/06* (2006.01)
*F16C 29/08* (2006.01)
*F16C 29/04* (2006.01)

(52) U.S. Cl.
CPC ............ *F16C 29/04* (2013.01); *F16C 29/0666* (2013.01); *F16C 29/088* (2013.01)
USPC .............................................. 384/15; 384/45

(58) Field of Classification Search
CPC ........................... F16C 29/084; F16C 29/088
USPC ........................................................ 384/15, 45
See application file for complete search history.

(56) References Cited

FOREIGN PATENT DOCUMENTS

| DE | 102007056860 A1 * | 5/2009 |
|----|---|---|
| JP | 7-286617 A | 10/1995 |
| JP | 2004-316762 A | 11/2004 |
| JP | 2006-64007 A | 3/2006 |
| JP | 3802938 B2 | 8/2006 |
| JP | 2010156381 A * | 7/2010 |
| JP | 2010185518 A * | 8/2010 |
| JP | 2011-15801 | 8/2011 |

OTHER PUBLICATIONS

International Search Report dated Oct. 16, 2012 with English translation (five (5) pages).

(Continued)

Primary Examiner — Phillip A Johnson
(74) Attorney, Agent, or Firm — Crowell & Moring LLP (57) ABSTRACT

A linear guide apparatus is provided in which an excellent sealing performance is achieved. The linear guide apparatus includes a retainer for retaining plural cylindrical rollers rotatably in a rolling element rolling passage. The retainer includes an opening portion and accommodates for retention of the plural cylindrical rollers in the opening portion. The retainer also includes an endless seal unit surrounding the opening portion. The seal unit includes an inward facing lip inclining toward the inner side of the opening portion and extending toward the guide rail to be in sliding contact with the guide rail. The inward facing lip is formed continuously all around the seal unit. The seal unit includes an outward facing lip inclining toward the outer side of the opening portion and extending toward the guide rail to be in sliding contact with the guide rail, in addition to the inward facing lip.

4 Claims, 6 Drawing Sheets

(56) References Cited

OTHER PUBLICATIONS

Japanese-language Written Opinion (PCT/ISA/237) dated Oct. 16, 2012 (three (3) pages).

International Preliminary Report on Patentability (PCT/IB/338) and (PCT/IB/373) dated Apr. 3, 2014 (six (6) pages).

Japanese Office Action dated Aug. 26, 2014 with English-language translation (Four (4) pages).

* cited by examiner

LINEAR GUIDE APPARATUS

TECHNICAL FIELD

The present invention relates to a linear guide apparatus.

BACKGROUND ART

In linear guide apparatuses, generally, a slider is typically provided with a lubricant, such as grease, filled therein to lubricate rolling elements and the raceway surface for the rolling elements. As the slider travels, the lubricant inside the slider is transferred by the rolling elements onto a guide rail to be discharged to the outside of the slider. Thus, addition of the lubricant is demanded to the inside of the slider through regular maintenance.

In general, linear guide apparatuses include seals for sealing openings at gaps between the guide rail and the slider to thereby prevent the lubricant in the slider from leaking to the outside and prevent external foreign substances from entering the slider. To describe in detail, the slider includes side seals for sealing openings at axial end faces of the slider and an under seal for sealing an opening at the underside of the slider. These openings are parts of the openings at the gaps between the guide rail and the slider, and the side seals and the under seal are designed to seal the entirety of the openings.

With all the openings sealed as described above, however, the lubricant in the slider still leaks to the outside in some cases. For example, a gap may be generated at a seam between a side seal and the under seal due to the shape accuracy of the seals, misalignment in the position of a seal in association with the travel of the slider, and other reasons. The lubricant may leak through this gap.

A technique is disclosed in PLT 1 for preventing the lubricant from leaking through such a gap generated at a seam between seals. In the technique in PLT 1, plural seals typically provided in a linear guide apparatus are integrated into an endless seal. This endless seal provides a seal around the rolling elements, thereby providing a structure with no seal seam and thus the leak of the lubricant hardly occurs.

CITATION LIST

Patent Literature

PTL 1: JP 3802938B

SUMMARY OF INVENTION

Technical Problem

The seal provided in the linear guide apparatus described in PLT 1 includes a lip in sliding contact with a guide rail to contribute to the sealing. This lip inclines in a direction away from peripheral parts of the rolling elements, which are the sealed parts, and extends toward the guide rail. Although a lip of such a configuration is highly capable of preventing the entry of foreign substances from the outside into the sealed parts, it is not sufficiently capable of preventing the leak of the lubricant from the inside of the sealed parts to the outside, leaving room for improvement.

It is therefore an object of the present invention to solve the problems of the prior art as described above and to provide a linear guide apparatus having an excellent sealing performance by which the lubricant leakage can be prevented.

Solution to Problem

In order to achieve the above object, aspects of the present invention include the following configurations. That is, according to an aspect of the present invention, there is provided a linear guide apparatus including: a guide rail having a rolling element raceway surface extending in an axial direction; a slider having a rolling element raceway surface facing the rolling element raceway surface of the guide rail, the slider being attached on the guide rail relatively movably in the axial direction; a plurality of rolling elements disposed rotatably in a rolling element rolling passage formed between the rolling element raceway surface of the guide rail and the rolling element raceway surface of the slider; and a retainer retaining the plurality of rolling elements in the rolling element rolling passage, wherein the retainer includes an opening portion for accommodating the plurality of rolling elements and an endless seal unit for surrounding and sealing the opening portion, wherein the seal unit includes an inward facing lip inclining toward an inner side of the opening portion and extending toward the guide rail to be in sliding contact with the guide rail, the inward facing lip being formed continuously all around the seal unit.

The seal unit may further include an outward facing lip inclining toward an outer side of the opening portion and extending toward guide rail to be in sliding contact with the guide rail.

Further, a side seal may be installed on an axial end portion of the slider for sealing an opening at a gap between the guide rail and the slider, and the side seal may include an inward facing seal and an outward facing seal, the inward facing seal having a lip inclining toward an inner side of the slider and extending toward the guide rail to be in sliding contact with the guide rail, the outward facing seal having a lip inclining toward an outer side of the slider and extending toward the guide rail to be in sliding contact with the guide rail.

Advantageous Effects of Invention

The linear guide apparatus according to the present invention includes a retainer having an opening portion accommodating the rolling elements. An endless seal unit surrounding the opening portion to seal the opening portion includes an inward facing lip formed continuously all around the seal unit. The inward facing lip inclines toward the inner side of the opening portion and extends toward the guide rail to be in sliding contact with the guide rail. Thus, the leak of a lubricant hardly occurs, and the excellent sealing performance is achievable.

DESCRIPTION OF EMBODIMENTS

Figure 1:
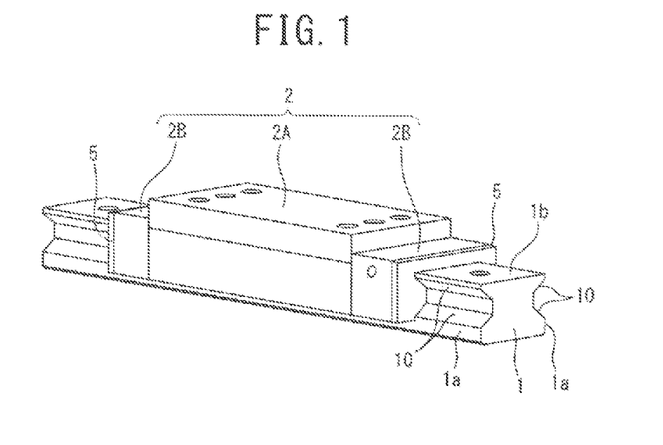
FIG. 1 is a perspective view illustrative of a structure of a linear guide apparatus according to an embodiment of the present invention.
Figure 2:
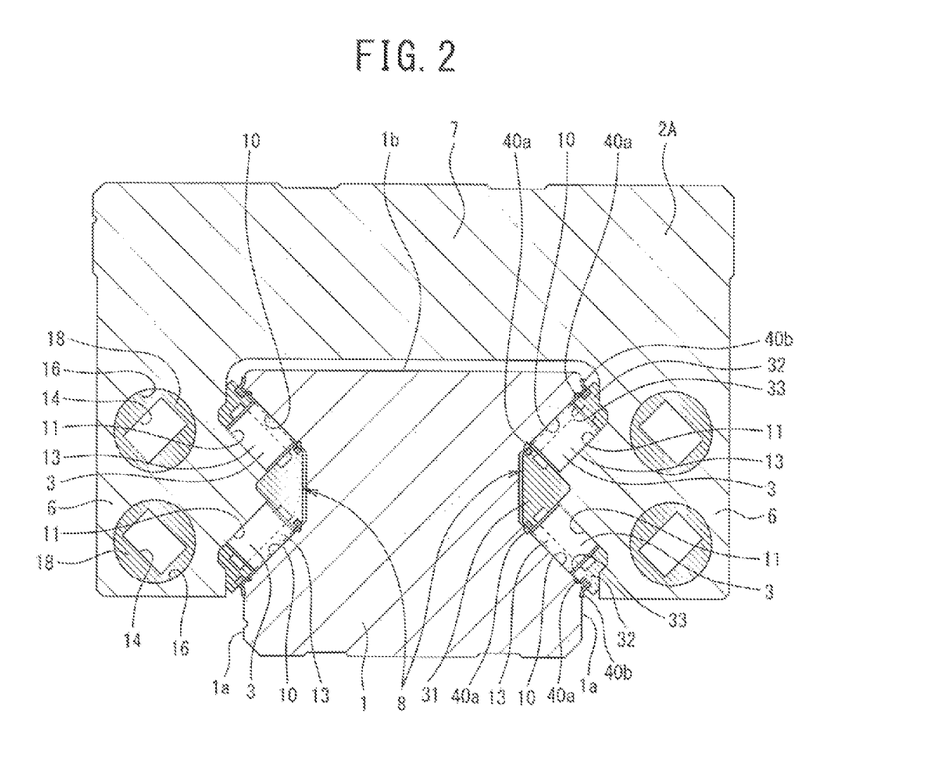
FIG. 2 is a sectional view of the linear guide apparatus in FIG. 1.
Figure 3:
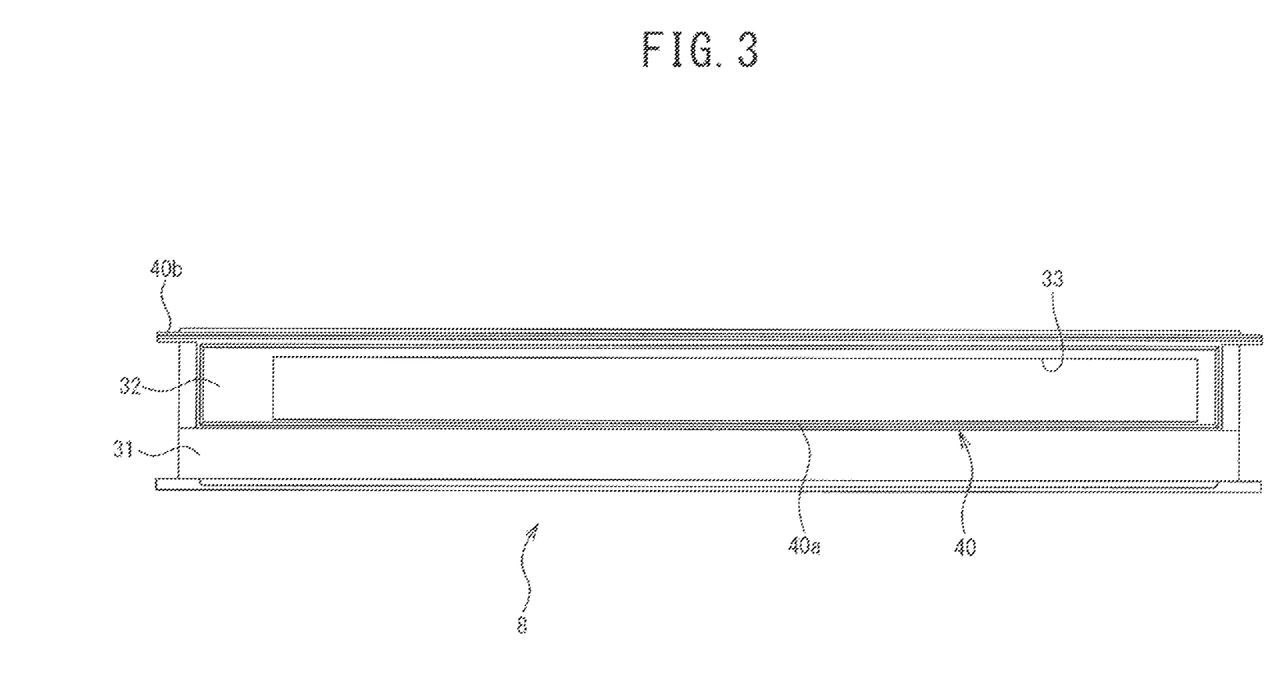
FIG. 3 is a diagram illustrative of a structure of a retainer for use in the linear guide apparatus in FIG. 1.
Figure 4:
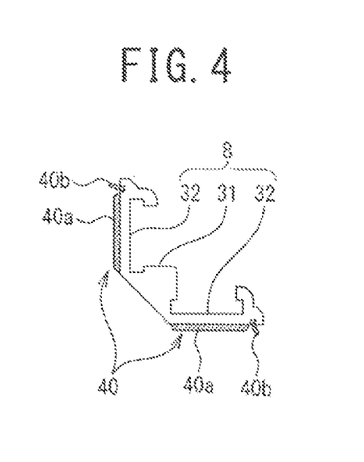
FIG. 4 is a diagram illustrative of an axial end face of the retainer in FIG. 3.
Figure 5:
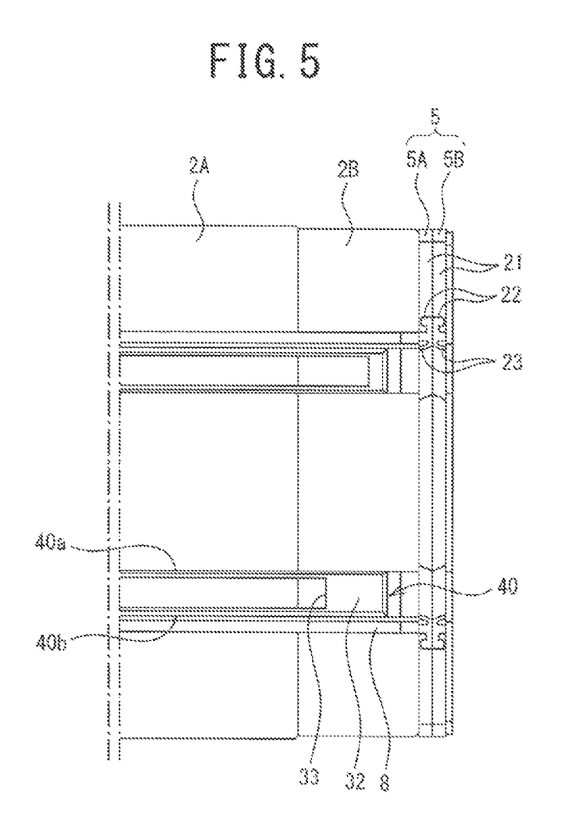
FIG. 5 is a diagram illustrative of a bottom face of a slider on which a side seal and the retainer installed.

Embodiments of a linear guide apparatus according to the present invention will now be described in detail with reference to the drawings. FIG. 1 is a perspective view illustrative of a structure of a linear guide apparatus according to an embodiment of the present invention. FIG. 2 is a sectional view taken along a plane orthogonal to an axial direction of the linear guide apparatus in FIG. 1. FIG. 3 is a diagram illustrative of a structure of a retainer for use in the linear guide apparatus in FIG. 1. FIG. 4 is a diagram illustrative of an axial end face of the retainer in FIG. 3. FIG. 5 is a diagram illustrative of a bottom face of a slider in which a side seal and the retainer are installed.

Like reference figures are used to indicate like or corresponding parts in the drawings. In the description below, a "section" refers to a section taken along a plane orthogonal to the axial direction, unless otherwise specified. Also in the description below, a term indicative of a direction, including "upper," "lower," "left," and "right," refers to such a direction in FIG. 2 for convenience of description, unless otherwise specified.

A guide rail 1, having a substantially rectangular sectional shape, extends in the axial direction. A slider 2 is mounted on the guide rail 1 so as to be movable in the axial direction. Recesses, extending in the axial direction, are formed in both right and left side faces 1a of the guide rail 1. In each recess, two inclined surfaces, one above the other, extend in the axial direction to form substantially a letter V shape. There are four inclined surfaces in total, with each forming a rolling element raceway surface 10.

The slider 2 includes a flat plate portion 7 and two arm portions 6. The flat plate portion 7 extends along a top face 1b of the guide rail 1. The arm portions 6 extend downward from right and left side portions of the flat plate portion 7 along the side faces 1a. The flat plate portion 7 and the arm portions 6 form substantially right angles, and thus the slider 2 has a sectional shape extending along the top face 1b and the both right and left side faces 1a of the guide rail 1. The slider 2 is movably attached on the guide rail 1 so that the guide rail 1 is interposed between the arm portions 6.

The slider 2 as described above includes a slider body 2A and end caps 2B detachably attached on axial end portions of the slider body 2A, respectively. The slider 2 also includes side seals 5 installed on its axial end portions (i.e., on an axial outer end face of each end cap 2B). The side seals 5 have sectional shapes formed similarly to those of the end caps 2B. As illustrated in FIG, 5, each side seal 5 includes a planar first seal 5A (i.e., an inward facing seal that is a configuration of the present invention) and a planar second seal 5B (i.e., an outward facing seal that is a configuration of the present invention). The first seal 5A, disposed at the axially inner side, and the second seal 5B, disposed at the axially outer side, are laminated in the axial direction.

The first seal 5A and the second seal 5B each include a reinforcement plate 21, made of a resin, metal, or the like, and a seal body 22, made of an elastic body. Lip portions 23 protrude further inwardly from inner surfaces of the seal bodies 22 to be in sliding contact with the top face 1b and the right and left side faces 1a (including the rolling element rolling grooves 10) of the guide rail 1, and seal an opening at an axial end face of the slider 2. The opening is a part of openings at gaps between the guide rail 1 and the slider 2.

A lip portion 23 of the first seal 5A inclines toward the inner side of the slider 2 and extends toward the guide rail 1 to be in sliding contact with the guide rail 1. This allows the first seal 5A to prevent leak of the lubricant through the gap between the guide rail 1 and the slider 2 to the outside (i.e., an excellent sealing performance for sealing the lubricant). A lip portion 23 of the second seal 5B inclines toward the outer side of the slider 2 and extends toward the guide rail 1 to be in sliding contact with the guide rail 1. This allows the second seal 5B to prevent an entry of a foreign substance from the outside through the gap between the guide rail 1 and the slider 2 (i.e., excellent dust resistance).

Examples of the elastic bodies included in the seal bodies 22 of the first seal 5A and the second seal 5B include rubber and a highly flexible resin. Specifically, the examples include nitrile rubber, fluoro rubber, silicone rubber, polyester elastomer, and urethane elastomer.

Although the side seal 5 in the present embodiment includes two laminated seals 5A and 5B, it may include three or more laminated seals. In the present embodiment, the first seal 5A disposed at the axially inner side includes the lip portion 23 that inclines toward the inner side of the slider 2, and the second seal 5B disposed at the axially outer side includes the lip portion 23 that inclines toward the outer side of the slider 2. Such a configuration is desirable to achieve the excellence in the lubricant sealing performance and the dust resistance. Conversely, however, the first seal 5A can be disposed at the axially inner side including the lip portion 23 that inclines toward the outer side of the slider 2, and the second seal 5B can be disposed at the axially outer side including the lip portion 23 that inclines toward the inner side of the slider 2.

Protrusions are formed on inner surfaces of the right and left arm portions 6 of the slider body 2A so as to extend in the axial direction and protrude toward the guide rail 1. On each protrusion, two inclined surfaces, one above the other, extend in the axial direction to form substantially a letter V shape. There are four inclined, surfaces at the right and the left in total and these surfaces constitute rolling element raceway surfaces 11 facing the rolling element raceway surfaces 10 of the guide rail 1, respectively. In other words, the number of rolling element raceway surfaces 10 of the guide rail 1 is identical to the number of rolling element raceway surfaces 11 of the slider 2.

Rolling element rolling passages 13 with substantially rectangular sectional shapes are formed between the rolling element raceway surfaces 10 of the guide rail 1 and the rolling element raceway surfaces 11 of the slider 2, respectively. The rolling element rolling passages 13 extend in the axial direction. Plural cylindrical rollers 3 that are rolling elements are rotatably loaded in each rolling element rolling passage 13 with retained by a retainer 8. The slider 2 moves along the guide rail 1 in the axial direction through the rolling of these cylindrical rollers 3.

The retainer 8 is a molding product formed of, for example, a resin material (examples of the resin include polyacetal and polyamide) and a metal material (examples of the metal include aluminum and steel). The retainer 8 includes a substantially triangular prismatic pillar portion 31 and two rectangular frame portions 32. The prismatic pillar portion 31 extends in the axial direction. The rectangular frame portions 32 extend from two of the three parallel sides of the pillar portion 31 to form substantially a letter V shape. Each rectangular frame portion 32 has an opening portion 33 formed therein to provide a rectangular through hole. In the opening portion 33, the plural cylindrical rollers 3 (also referred to as a "rolling element row" hereinafter) are accommodated for retention. The plural cylindrical rollers 3 line up in a longitudinal direction of the rectangular frame portion 32, and both end faces of each cylindrical roller 3 are guided by an interior surface of the opening portion 33 in the axial direction.

The retainer 8 is secured to the slider 2 in a manner such that one, of the three parallel sides of the pillar portion 31, with no rectangular frame portion 32, faces a vertex portion of the protrusion formed on the inner surface of an arm portion 6 of the slider body 2A and that the two rectangular frame portions 32 extend along the rolling element raceway surfaces 10 and 11 (that is, the retainer 8 extends along the inner surface of the arm portion 6). A portion to be secured is not particularly limited example, the pillar portion 31 may be secured to the inner surface of the arm portion 6 of the slider body 2A, or axial end portions of the retainer 8 may be secured to the end caps 2B, respectively.

The retainer 8 also includes an endless seal unit 40 surrounding the opening portion 33. In other words, a base end portion of the seal unit 40 is fitted into a groove formed in the retainer 8 to secure the retainer 8 to the seal unit 40. The seal unit 40 includes an inward facing lip 40a formed all around the seal unit 40 continuously. The inward facing lip 40a inclines toward the inner side of the opening portion 33 and extends toward the guide rail 1 to be in sliding contact with the guide rail 1. Thus, the endless seal unit 40 allows the lubricant (not illustrated), such as grease or lubricating oil, provided to lubricate the cylindrical rollers 3 and the rolling element raceway surfaces 10 and 11 to be sealed within the opening portion 33.

The seal unit 40 further includes an outward facing lip 40b in addition to the inward facing lip 40a. The outward facing lip 40b inclines toward the outer side of the opening portion 33 and extends toward the guide rail 1 to be in sliding contact with the guide rail 1. The outward facing lip 40b is formed at the outer side of the inward facing lip 40a (i.e., at a position farther apart from the opening portion 33 than the inward facing lip 40a). Moreover, although the inward facing lip 40a is formed all around the seal unit 40, the outward facing lip 40b is provided, in the axial direction only at a longer side of the substantially rectangular seal unit 40, on the farther side from the pillar portion 31. In other words, the inward facing lip 40a has no end, whereas the outward facing lip 40b is linear. The outward facing lip 40b extends so that its both ends reach the side seals 5.

Each outward facing lip 40b enhances the lubricant sealing performance and prevents a foreign substance from entering the rolling element rolling passages 13. To describe in detail, the lower outward facing lip 40b of the two outward facing lips 40b (i.e., the outward facing lip 40b disposed at a lower portion of the slider 2) enhances the dust resistance for an opening at the bottom face side of the slider 2 out of the openings at the gaps between the guide rail 1 and the slider 2. In other words, the lower outward facing lip 40b has a function of a conventional under seal. Additionally, the upper outward facing lip 40b (i.e., the outward facing lip 40b disposed near an inner corner of the slider 2) prevents a foreign substance that has entered the slider 2 through the side seal 5 from entering the rolling element rolling passage 13 from the top face 1b of the guide rail 1. In other words, the upper outward facing lip 40b has a function of a conventional inner seal.

The seal units 40 are formed of elastic bodies, and examples of the elastic bodies include rubber and a highly flexible resin. Specifically, the examples include nitrile rubber, fluoro rubber, silicone rubber, polyester elastomer, and urethane elastomer.

Figure 6:
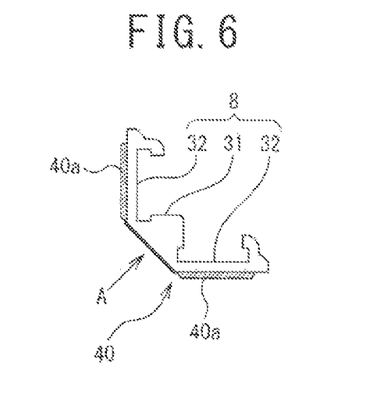
FIG. 6 is a diagram illustrative of an axial end face of a retainer with a seal unit formed into a sheet and bonded with an adhesive.
Figure 7:
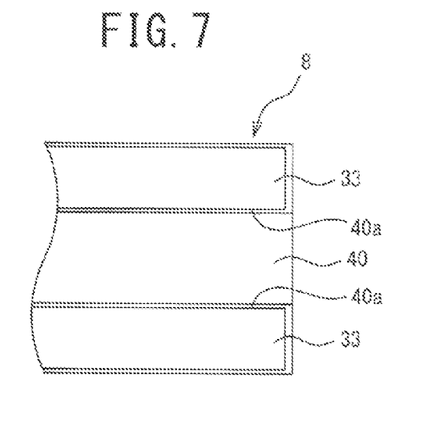
FIG. 7 is a diagram illustrative of the retainer in FIG. 6, when viewed from arrow A.

It is to be noted that the outward facing lip 40b may not be provided in a case where the need to consider the entry of a foreign substance from the outside is low. Although one seal unit 40 includes the inward facing lip 40a and the outward facing lip 40b according to the present embodiment, two separate seal units may be provided on the retainer 8, with the endless seal unit including the inward facing lip 40a and the linear seal unit including the outward facing lip 40b. Although the retainer 8 and the seal unit 40, which are separate components, are secured by fitting according to the present embodiment, they may be secured through a commonly used means, such as bonding with an adhesive, in place of fitting. For example, a seal unit 10 formed into a sheet may be bonded to a surface of the retainer 8 with an adhesive, as illustrated in FIG. 6 and FIG. 7. In the case of a retainer 8 made of a resin material, the retainer 8 and a seal unit 40 may be integrally molded through two color molding or the like.

The slider 2 further includes linear passages 14 penetrating through the slider body 2A in the axial direction in parallel to the rolling element rolling passages 13 at thick upper portions and lower portions of the right and left arm portions 6. The linear passages are straight holes with substantially rectangular sectional shapes. For example, a linear passage 14 is formed by extending a hole 16 in the arm portion 6 in the axial direction and inserting therein a tubular component 18 having an interior surface with a sectional shape fitting the shapes of the cylindrical rollers 3 to provide a straight hole formed by the interior surface of the tubular component 18. In a case where the rolling elements are in the form of balls, the linear passage 14 desirably has a substantially circular sectional shape.

On the other hand, the end caps 2B are, for example, mad of moldings of a resin material and formed to have sectional shapes similar to those of the slider body 2A. The end cap 2B includes on its back face (i.e., the face in contact with the slider body 2A) at both right and left sides thereof two levels of partially-toroidal curved passages (not illustrated), one level above the other, with substantially rectangular sectional shapes. With the end cap 2B attached on the slider body 2A, the rolling element rolling passages 13 communicate with the linear passages 14 through the curved passages, respectively. A linear passage 14 and the curved passages at both ends constitute a rolling element return passage to feed the cylindrical rollers 3 from an end point to a start point of a rolling element rolling passage 13 (i.e., the number of the rolling element return passages provided is identical to the number of the rolling element rolling passages 13). The rolling element rolling passage 13 and the rolling element return passage constitute a substantially annular rolling element circulation passage. Such substantially annular rolling element circulation passages are formed on both right and left sides of the guide rail 1.

When the slider 2 mounted on the guide rail 1 moves along the guide rail 1 in the axial direction, the cylindrical rollers 3 loaded in the rolling element rolling passage 13 move in a direction identical to that of the slider 2 in relation to the guide rail 1, as they roll in the rolling element rolling passage 13. When the cylindrical rollers 3 reach the end point of the rolling element rolling passage 13, they are fed from the rolling element rolling passage 13 to a curved passage. The cylindrical rollers 3 that have entered the curved passage make a U-turn and are introduced to the linear passage 14 to go through the linear passage 14 and reach the opposite curved passage. The cylindrical rollers 3 again make a U-turn therein to return to the start point of the rolling element rolling passage 13. Such circulation in the rolling element circulation passage is repeated infinitely.

In a typical linear guide apparatus, the travel of a slider (i.e., rolling of the rolling elements) causes the rolling elements to transfer a lubricant, disposed in the slider to lubricate the rolling elements and rolling element raceway surfaces, onto a guide rail to discharge the lubricant to the outside of the slider. In the linear guide apparatus according to the present embodiment, however, the lubricant disposed in the slider 2 to lubricate the cylindrical rollers 3 which are the rolling elements, or the rolling element raceway surfaces 10 and 11 is sealed within the opening portion 33 with the endless seal unit 40.

To describe in detail, since the seal unit 40 is continuous endlessly with no seam, the leak of the lubricant through a gap generated in a seam does not occur and thus the lubricant is sealed within the opening portion 33. Additionally, a lip of the seal unit 10 is the inward facing lip 40a, which inclines toward the inner side of the opening Portion 33 and extends toward the guide rail 1 to be in sliding contact with the guide rail 1. Thus, the leak of the lubricant across the lip hardly occurs and an enhanced lubricant sealing performance is achieved, as compared to an outward facing lip that inclines toward the outer side of the opening portion 33 and extends toward the guide rail 1.

The linear guide apparatus according to the present embodiment, therefore, retains the lubricant in the slider 2 which travels, and, moreover, allows the lubricant to be sealed in an area surrounding the cylindrical rollers 3 needing the lubrication so that the lubricant is gathered where the lubrication is needed. Accordingly, a high lubricating effect is exhibited and a prolonged life is achieved. To prevent the lubricant from passing along the cylindrical rollers 3 to leak from the inside of the slider 2 to the outside, the endless seal unit 40 including the inward facing lip 40a desirably surrounds the cylindrical rollers 3 as close as possible to the cylindrical rollers 3. This prevents the leak of the lubricant and allows the lubricant to be sealed within an area nearest to the cylindrical rollers 3 needing the lubrication, exerting a higher lubricating effect and deriving a further prolonged life for the linear guide apparatus according to the embodiment.

Figure 8:
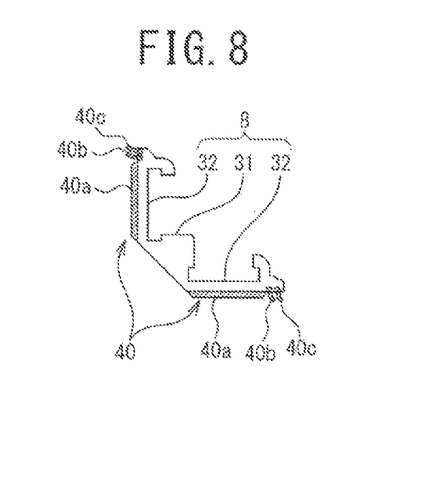
FIG. 8 is a diagram illustrative of an axial end face of a retainer including a seal unit having a second outward facing lip.
Figure 9:
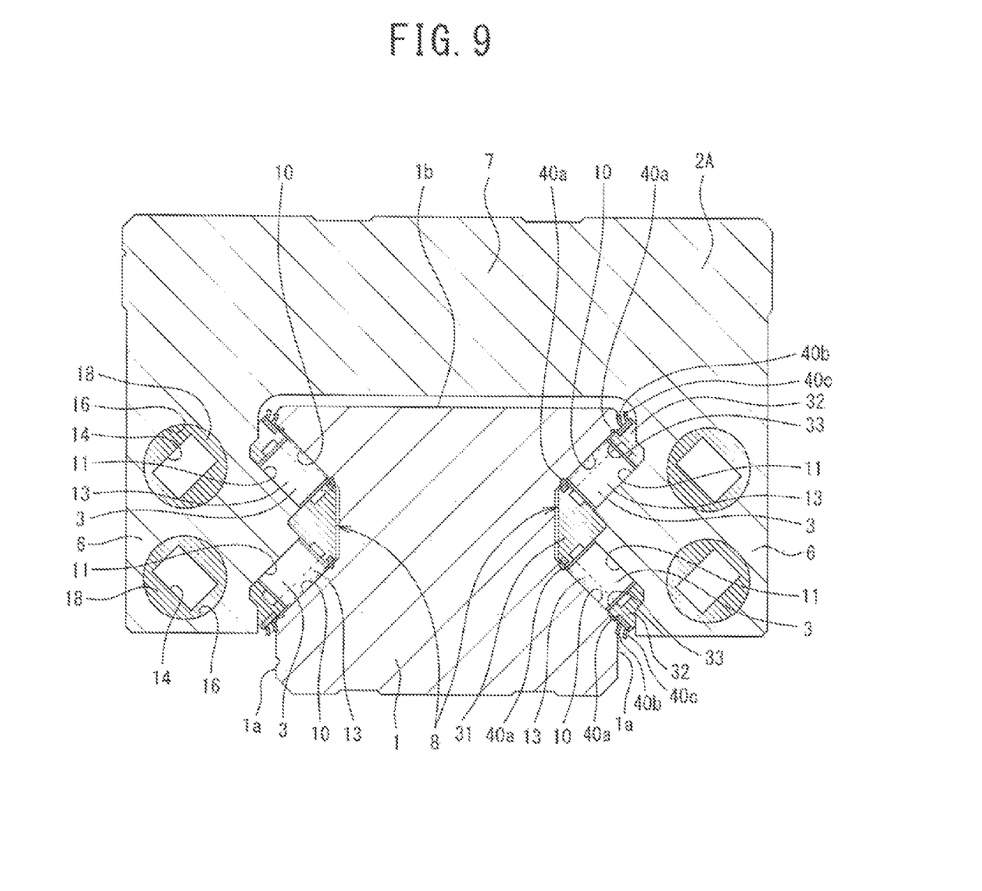
FIG. 9 is a sectional view illustrative of a linear guide apparatus into which the retainer in FIG. 8 is assembled.

The seal unit 40 includes the outward facing lip 40b in addition to the inward facing lip 40a, thereby further enhancing the lubricant sealing performance and preventing the entry of a foreign substance across the outward facing lip 40b to the inside, and thus achieving the excellent dust resistance of the linear guide apparatus according to the present embodiment. Additionally, a second outward facing lip 40c may further be provided, as illustrated in FIG. 8 and FIG. 9, at the outer side of the outward facing lip 40b (i.e., at a position farther apart from the opening portion 33 than the outward facing lip 40b) in such a manner that the second outward facing lip 40c inclines toward the outer side of the opening portion 33 and extends toward the guide rail 1 not in contact with the guide rail 1. The second outward facing lip 40c has a shape and a configuration similar to those of the outward facing lip 40b. The second outward facing lip 40c is not in contact with the guide rail 1 and thus does not deform, thereby preventing the entry of a foreign substance across the second outward facing lip 40c into the inside, further strengthening the dust resistance of the linear guide apparatus.

Additionally, the side seals 5 installed on the axial end portions of the slider 2 each include the first seal 5A and the second seal 5B that are laminated in the axial direction. The first seal 521 includes the lip portion 23 that inclines toward the inner side of the slider 2, and the second seal 5B includes the lip portion 23 that inclines toward the outer side of the slider 2. This provides the excellent lubricant sealing performance and dust resistance at parts, facing the axial end faces of the slider 2, of the openings at the gaps between the guide rail 1 and the slider 2.

The axial end portions of the slider 2 may be susceptible to the leak of the lubricant and the entry of a foreign substance, but the side seals 5 with such a configuration as described above enhance the lubricant sealing performance and the dust resistance of the slider 2 at the axial end portions. In the case where the need to consider the entry of a foreign substance from the outside is low, the side seal 5 may be configured with only the first seal 5A including the lip portion 23 that inclines toward the inner side of the slider 2. This can reduce a frictional force of the seal and thus allows the slider 2 to move more smoothly. In the case where the lubricant may leak through a gap at a seam between the side seal 5 and the seal unit 40, a seal formed continuously without a seam with the seal unit 40 and the seal body 22 of the side seal 5 (i.e., a seal formed to integrate the seal unit 40 and the side seal 5) may be used in order to prevent the leak of the lubricant.

The present embodiment has been described to present some examples of the present invention and the present invention is not limited to the above embodiment. For example, the opening portion 33 may be large enough to accommodate the entire rolling element row. Alternatively, there may be plural opening portions that each accommodate a part of plural cylindrical rollers 3 constituting the rolling element, row, so that these opening portions accommodate the entire plural cylindrical rollers 3 constituting the rolling element row. Alternatively, there may be plural opening portions that each accommodate a cylindrical roller 3 individually, and these opening portions may accommodate the entire plural cylindrical rollers 3 constituting the rolling element row.

For a configuration with plural opening portions, these may be endless seal units 40 each surrounding an opening portion, or one endless seal unit 40 may surround the plural opening portions.

Figure 10:
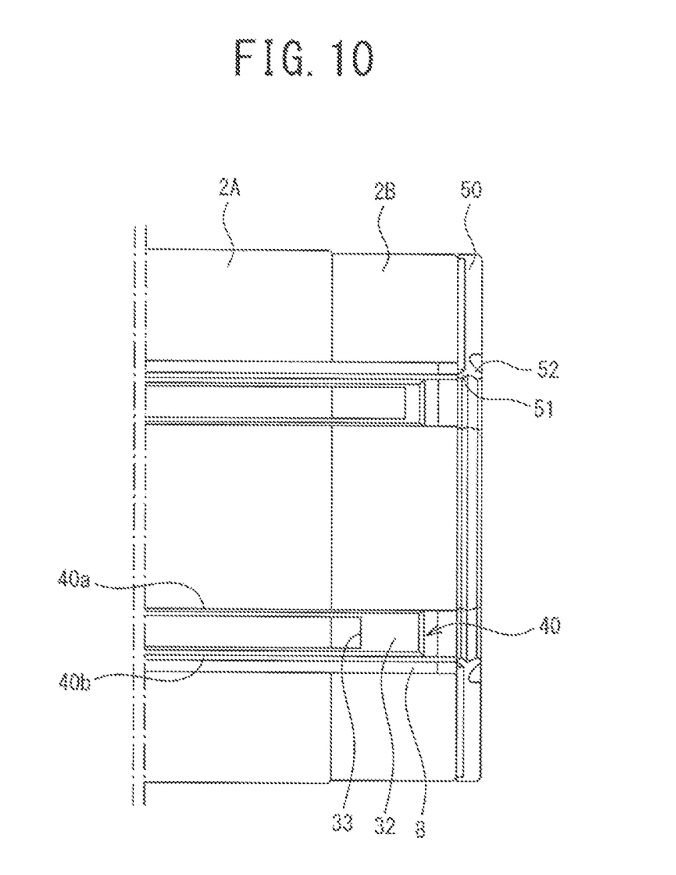
FIG. 10 is a diagram illustrative of a bottom face of a slider in which a side seal according to a modification and the retainer is installed.

Furthermore, a conventional and common side seal may be used in place of the side seal 5 as described above. The conventional and common side seal includes a lip with two split ends, as illustrated in FIG. 10. In other words, such a side seal 50 includes an inward facing lip 51 and an outward facing lip 52. The inward facing lip 51 inclines toward the inner side of the slider 2 and extends toward the guide rail 1 to be in sliding contact with the guide rail 1, whereas the outward facing lip 52 inclines toward the outer side of the slider 2 and extends toward the guide rail 1 to be in sliding contact with the guide rail 1. The outward facing lip 52 is larger than the inward facing lip 51.

A linear guide apparatus according to a modification illustrated in FIG. 10 includes the side seal 50 with the lip having the two ends as described above. Hence, although this modification is slightly lower in the lubricant sealing performance through the inward facing lip 51 than that of the linear guide apparatus according to the present embodiment described above, this modification offers the excellent dust resistance through the outward facing lip 52 similar to that of the linear guide apparatus according to the present embodiment described above, and the side seal 50 has a lower frictional force.

Furthermore, the type of rollers is not limited to a cylindrical roller, and other types of rollers, such as a tapered roller and a needle roller, may be used. The rolling element is also not limited to a roller, but may be a ball. In the case where the rolling elements are balls, rolling element raceway surfaces 10 and 11 have groove surfaces with substantially arc sections, in place of planar sections, and a rolling element rolling passage 13 has a substantially circular sectional shape. Furthermore, in the case where the rolling elements are rollers, any number of rolling element raceway surfaces 10 and 11 included in a guide rail 1 and a slider 2 may be provided, as far as two or more rolling element raceway surfaces 10 and 11 are provided, respectively. The numbers are not limited to two rows at one side, for example, three rows may be provided at one side. In the case where the rolling elements are balls, the rolling element raceway surfaces 10 and 11 included in a guide rail 1 and a slider 2 may be provided to arrange in a single row (one row at one side) or in plural rows (two rows or more at one side).

Furthermore, the type of grease usable as a lubricant in the linear guide apparatus according to the present embodiment is not particularly limited. Although the common grease is usable, urea grease containing a urea compound as a thickener or a lithium soap grease containing a lithium soap as the thickener is desirable. The consistency of grease is desirably not less than 445 and not more than 475. Grease having such a consistency has high flowability and thus tends to spread over the inside of the rolling element circulation passage entirely. Thus, a lubrication failure rarely occurs. The linear guide apparatus according to the present embodiment includes the seal unit. 40, and thus the leak of grease even with the high flowability.

REFERENCE SIGNS LIST

1 Guide rail
2 Slider
3 Cylindrical roller
5 Side seal
5A Inward facing seal
5B Outward facing seal
8 Retainer
10 Rolling element raceway surface
11 Rolling element raceway surface
13 Rolling element rolling passage
23 Lip portion
33 Opening portion
40 Seal unit
40*a* Inward facing lip
40*b* Outward facing lip

The invention claimed is:

1. A linear guide apparatus, comprising:
  a guide rail having a rolling element raceway surface extending in an axial direction;
  a slider having a rolling element raceway surface facing the rolling element raceway surface of the guide rail, the slider being attached on the guide rail relatively movably in the axial direction;
  a plurality of rolling elements disposed rotatably in a rolling element rolling passage formed between the rolling element raceway surface of the guide rail and the rolling element raceway surface of the slider; and
  a retainer retaining the plurality of rolling elements in the rolling element rolling passage,
  wherein the retainer includes an opening portion for accommodating the plurality of rolling elements and an endless seal unit for surrounding and sealing the opening portion, and
  wherein the seal unit includes an inward facing lip inclining toward an inner side of the opening portion and extending toward the guide rail to be in sliding contact with the guide rail, the inward facing lip being formed continuously all around the seal unit.

2. The linear guide apparatus according to claim 1, wherein the seal unit further includes an outward facing lip inclining toward an outer side of the opening portion and extending toward guide rail to be in sliding contact with the guide rail.

3. The linear guide apparatus according to claim 2, wherein a side seal is installed on an axial end portion of the slider for sealing an opening at a gap between the guide rail and the slider, the side seal including an inward facing seal and an outward facing seal, the inward facing seal having a lip inclining toward an inner side of the slider and extending toward the guide rail to be in sliding contact with the guide rail, the outward facing seal having a lip inclining toward an outer side of the slider and extending toward the guide rail to be in sliding contact with the guide rail.

4. The linear guide apparatus according to claim 1, wherein a side seal is installed on an axial end portion of the slider for sealing an opening at a gap between the guide rail and the slider, the side seal including an inward facing seal and an outward facing seal, the inward facing seal having a lip inclining toward an inner side of the slider and extending toward the guide rail to be in sliding contact with the guide rail, the outward facing seal having a lip inclining toward an outer side of the slider and extending toward the guide rail to be in sliding contact with the guide rail.

* * * * *